United States Patent [19]

Kivari et al.

[11] Patent Number: 5,430,740
[45] Date of Patent: Jul. 4, 1995

[54] INDICATION OF DATA BLOCKS IN A FRAME RECEIVED BY A MOBILE PHONE

[75] Inventors: Raimo Kivari, Haukipudas; Seppo E. Salow, Oulu, both of Finland

[73] Assignee: Nokia Mobile Phones, Ltd., Salo, Finland

[21] Appl. No.: 48,990

[22] Filed: Apr. 16, 1993

Related U.S. Application Data

[63] Continuation-in-part of Ser. No. 823,245, Jan. 21, 1992, abandoned.

[51] Int. Cl.⁶ .................. G06F 11/10; H03M 13/00
[52] U.S. Cl. ................................. 371/37.1; 371/36
[58] Field of Search ............... 371/37.1, 35, 36, 30, 371/37.5, 61; 307/211; 326/35

[56] References Cited

U.S. PATENT DOCUMENTS

| | | | |
|---|---|---|---|
| 4,134,103 | 1/1979 | Huxtable et al. | 340/146.1 AB |
| 4,290,116 | 9/1981 | Morse | 364/900 |
| 4,794,601 | 12/1988 | Kikuchi | 371/36 |

Primary Examiner—Robert W. Beausoliel, Jr.
Assistant Examiner—Phung My Chung
Attorney, Agent, or Firm—Darby & Darby

[57] ABSTRACT

The inventive data decoding system provides 3/5 voting on data blocks (1 . . . 11) received in a frame. A counter circuit of the system counts the bits in the data blocks and raises a repeat flag (RFLAG) at the end of each data block. The RFLAG signal causes an interrupt in a controlling processor, enabling the processor to monitor and control the receiving synchronism. The inventive procedure can be used on Forward Control Channel (FOCC) and Forward Voice Channel (FVC) channels in the Total Access Communication System (TACS) or the Advanced Mobile Phone Services (AMPS) mobile phone systems.

20 Claims, 4 Drawing Sheets

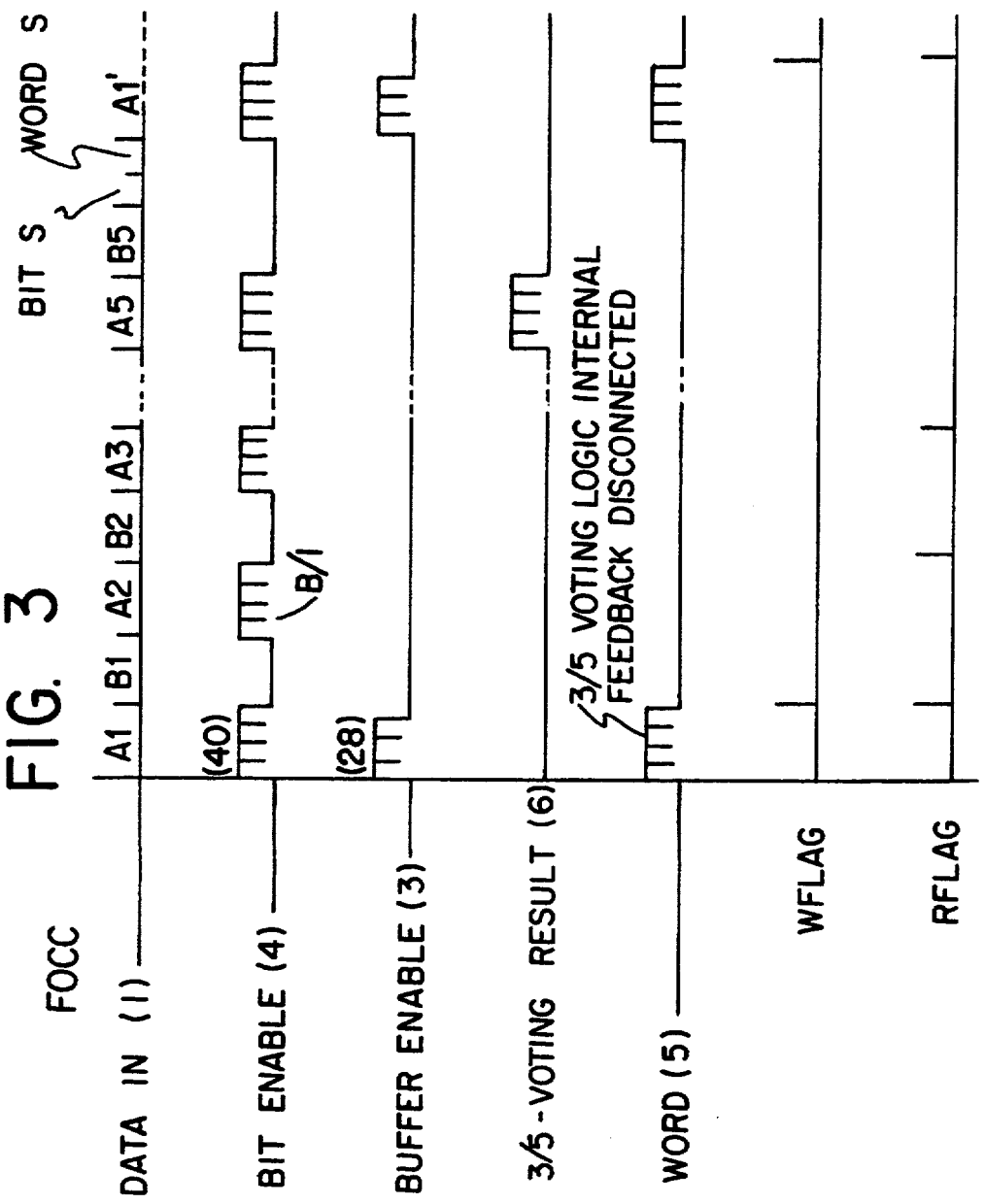

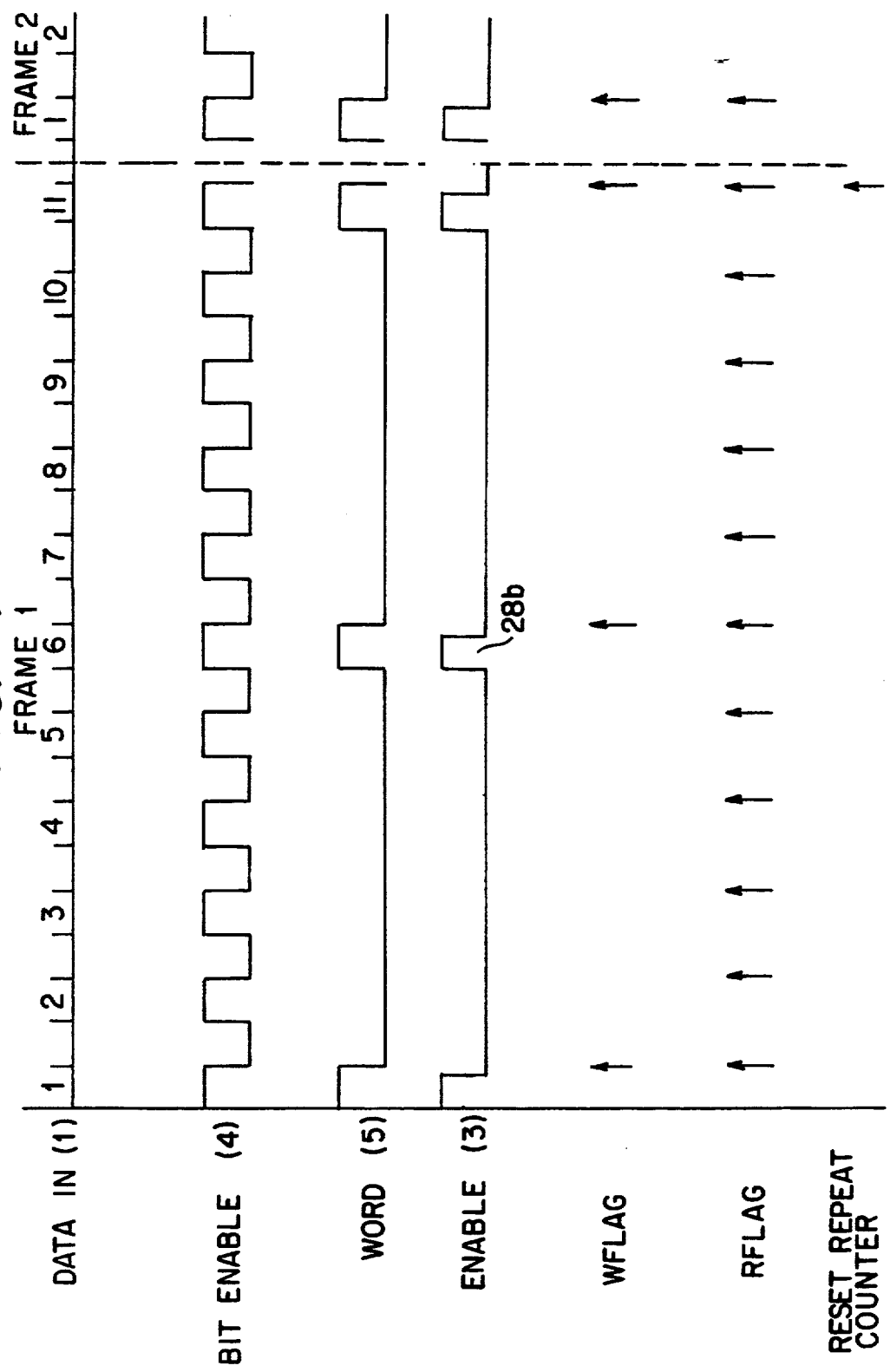

INDICATION OF DATA BLOCKS IN A FRAME RECEIVED BY A MOBILE PHONE

This application is a continuation-in-part of U.S. patent application Ser. No. 07/823,245 filed Jan. 21, 1992, now abandoned.

The present invention relates to data decoding logic arrangements in mobile phones, and more specifically to the indication of data blocks in a frame received by a mobile phone.

BACKGROUND OF THE INVENTION

The Total Access Communication System (TACS) and the Advanced Mobile Phone Services (AMPS) mobile phone systems provide a three out of five voting arrangement on data received by the mobile phone, this data being, e.g., the Forward Control Channel (FOCC) data or Forward Voice Channel (FVC) data, which is sent from a base station in frames containing data blocks that are repeated at least five consecutive times. This 3/5 voting may be performed in a straight forward way, e.g., by a microprocessor which stores five received data blocks in a memory and then performs a voting procedure on all received five data blocks in accordance with a code or algorithm stored in the processor program memory. The voting and coding may also be performed mainly by hardware when the data blocks are stored in registers, and the above mentioned algorithm is performed by logic circuits.

In a copending U.S. patent application (Ser. No. 07/823,167), titled "Method and circuit for performing 3/5 major voting", the inventors have presented a new and inventive arrangement which performs the voting process in logic hardware, which in a preferred form contains only two data registers to store relevant data. The present invention in its preferred form utilizes this new voting arrangement. The present invention is, however, not limited to the above-mentioned 3/5 voting arrangement, as a person skilled in the art can devise other suitable voting arrangements to operate as the voting block of the present invention.

There are commercially available modem circuits that perform 3/5 voting and decoding of messages, i.e., of data blocks. These modem arrangements do not keep track of which data block is currently received, i.e., they do not indicate to the mobile phone's controlling microprocessor whether the received data block is the first block or any other consecutive block. This will cause a problem on the voice channel, when a multi-frame message, such as for example, when a Calling Line Identification (CLI) message is sent from a land station to a mobile station.

The start of the CLI frame or other multiframe message, i.e., the start of control information data, is detected in the mobile phone when a synchronization word is received. The mobile phone can then use a timer to indicate the end of a frame. However, the timer is not very exact, and thus timing may be lost, resulting in lost information. The main objective of the present invention is thus to provide an accurate and reliable arrangement for indicating data blocks in frame, which obviates the above mentioned problem.

SUMMARY OF THE INVENTION

The inventors have found that an arrangement for decoding and performing voting on an incoming data stream is advantageously arranged to produce detection information by counting the data blocks received and raising a repeat flag at the end of each data block, so that a mobile phone microprocessor is supplied with information identifying received data blocks.

BRIEF DESCRIPTION OF THE DRAWINGS

The present invention is further described by an example referring to the enclosed drawings, where:

FIG. 3 shows a simplified timing diagram for essential FOCC signals of the arrangement in FIG. 1; and FIG. 4 shows a simplified timing diagram for essential FVC signals of the arrangement in FIG. 1.

DESCRIPTION OF THE PREFERRED EMBODIMENT

Figure 1:
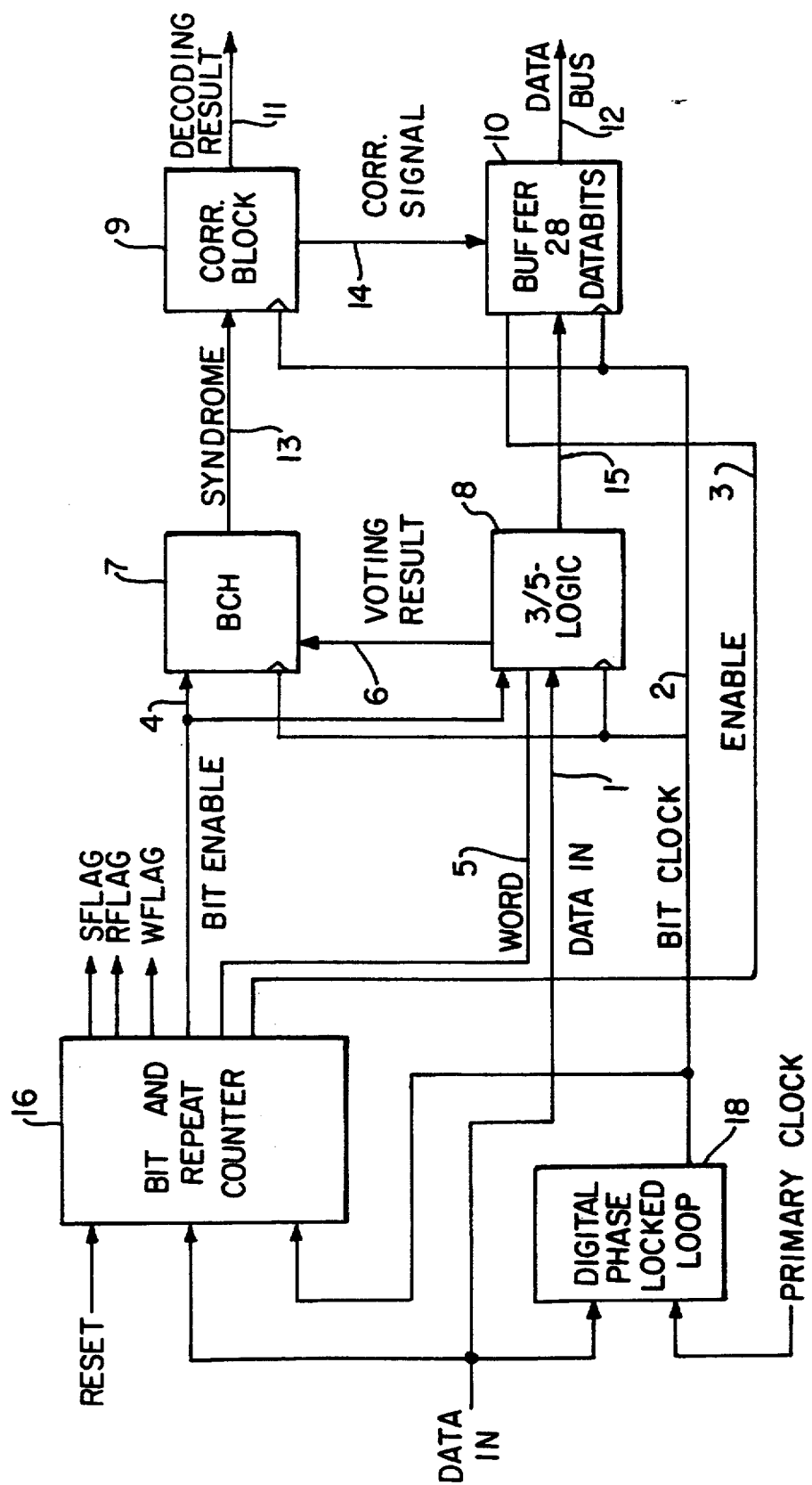
FIG. 1 shows a simplified block diagram of an arrangement, which is able to produce timing information and process data frames according to the present invention.

The arrangement in FIG. 1 consists of a BCH decoding block 7 (BCH=Bose-Chaudhuri-Hocquenghem coding/decoding), a correction block 9, a 3/5 voting logic element 8, a data buffer 10, and receiver timing block 16, containing bit and repeat counters. BCH decoding is well known in the art, for example, ANSI/EIA/TIA Standard 553 "Mobile Station—Land Station Compatibility Specification." Also, BCH coding and decoding is discussed in W. Wesley Peterson and E. J. Weldon, Jr., *Error-Correcting Codes*, (M.I.T. Press 1972). In the embodiment shown in the figures, this inventive arrangement in a mobile phone receives an incoming data bit stream on Data in line (1). This data bit stream contains Forward Control Channel (FOCC) and Forward Voice Channel (FVC) data, including multiframe message data, such as CLI message data. The data streams are sent to the mobile station from a base station or a land station in a TACS/AMPS mobile phone system. The data is generated for example at 10 kb/s in the case of an AMPS system or 8 kb/s in the case of a TACS system. According to the system standards, the data is encoded into frames as shown in FIGS. 2a and 2b.

Figure 2A:
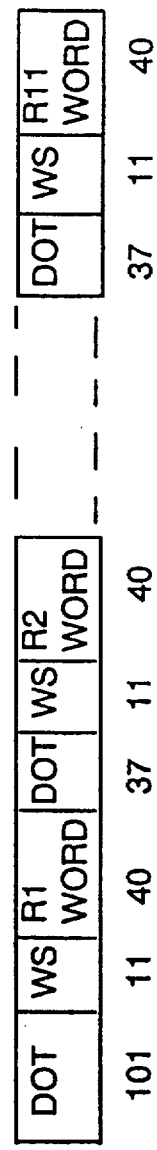
FIG. 2a shows the format of the Forward Voice Channel (FVC) data stream.
Figure 2B:
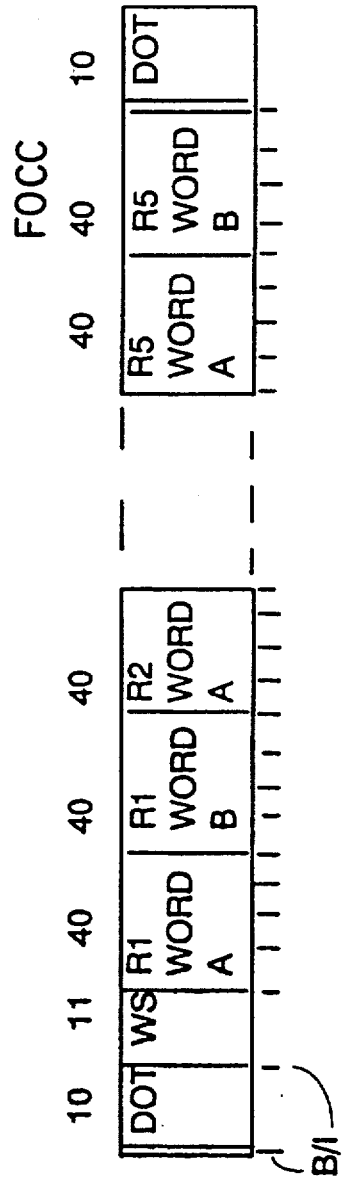
FIG. 2b shows the format of the Forward Control Channel (FOCC) data stream.

The format of the FOCC message stream is shown in FIG. 2b, in the land-to-mobile direction. Each FOCC channel consists of three discrete information streams, called stream A, stream B and busy-idle (B/I) stream, that are time division multiplexed. A 10-bit dotting sequence (DOT) and an 11-bit word sync (WS) sequence are sent to the mobile station to synchronize the mobile station with the incoming data. Each word contains 40 bits, including parity, and is repeated 5 times (R(1)/WORD ... R(5)/WORD); this data structure is then referred to as an FOCC word block. Word blocks A1–A5, B1–B5, are shown in FIG. 3.

The present invention may be used on both the Forward Control Channel (FOCC) and the Forward Voice Channel (FVC). The invention is described in more detail using the FVC channel CLI message data stream as an example. It should be understood that the invention is equally applicable to general multiframe messages, of which CLI messages is just an example.

As shown in FIG. 2a, the FVC channel data stream contains, a bit synchronizing or dotting sequence DOT (37 bits, except at the first repeat of the word, where a 101-bit dotting sequence is used) and a word synchronizing sequence WS (11 bits) to synchronize the mobile station with the incoming data. Each FVC word R(x)/WORD contains 40 bits, including parity, and is repeated 11 times (x=1 ... 11) together with the 37-bit dotting and 11-bit word sync sequences. This data structure is then referred to as a word block. Each word is formed by encoding 28 content bits, otherwise known as the data portion, into a (40, 28) BCH code, so that the 28 most significant bits of the 40 bit long field are the content bits and the 12 least significant bits are parity bits. The parity bits are used to correct possible bit errors and also to indicate if all possible errors could be corrected or not.

The circuit arrangement of FIG. 1 receives the FVC word data stream on Data in line (1). The data stream Data in (1) is also shown in the timing diagram of FIG. 4, where bit synchronization DOT and word synchronization WS are shown only as intervals between the words (Bit s & Word s).

A multi-frame FVC message, such as a CLI message, is sent from a base station in the TACS/AMPS mobile phone system in order to send control signals to the mobile phone. The CLI message comprises multiple consecutive message frames, for instance 9 or 33, each message frame having one FVC word block. A single frame length is about 100 ms, and thus the total length of a CLI message is for instance about 0.9 or 3.3 seconds (9 or 33 * 11 words, including sync). The start of the CLI frame, i.e., the start of the control information data, is detected in the mobile phone by the synchronization word.

In the prior art modem circuit mentioned above, only a timer is used, thus there is no way of indicating the order of received words. The timer has an interval which is a little longer than 100 ms and will produce a signal to indicate the location in time of the end of frame, and thus alert the processor to the start of the next frame. The timer will enable the processor to keep track of the frames in such cases where the receiver has lost a part of the frame data. The timer is by nature not very exact, and so it is possible that the timing may be lost, resulting in slippage over the frame edge or a combination of data from two different frames which completely distorts the original information.

The arrangement according to the present invention, shown in FIG. 1, will produce more accurate timing due to the counting of repeated words, and thus it will provide for more reliable operation of the mobile station.

During operation, the 3/5 voting logic element 8 receives the data stream 1 enabled by the bit enabled signal 4, and compares the number of ones and zeros in each particular bit position of each received data block, in order to produce the voting result. Ideally, a particular bit position within each data block should be the same for all received data blocks in a set. However, errors may occur causing comparable bits in some of the received data blocks to be incorrect. The voting result 6 of the 3/5 voting logic element 8 is clocked to the BCH-decoding logic block 7, which can correct a one bit error and also detect several bit faults, and then store the voting result in a register (not shown). At the end of the fifth data block (the fifth block in a selected set of five blocks) the voting logic element 8 contains the voting result and the output of the BCH decoding logic block 7 supplies the syndrome 13 of the received data frame, the syndrome being a signal indicating whether the frame contained faults or whether it was correct. The syndrome is supplied to the correction block 9, which then presents the decoding result 11 at its output. The decoding result (11) indicates the status of the received set and the correction block (9) changes the decoding result from indicating a faulty set to indicating a corrected set based on whether a bit error could be corrected or not. Thus, the decoding result (11) indicates whether a set has been received error-free, has been corrected through BCH-decoding or is erroneous.

It should be noted that in the preferred embodiment of the present invention there is no need to store the multiple repeated frames, since as they are being received, the majority voting is being carried out. Thus, when the fifth repeated frame has been received, the majority voting result is available.

The buffer enable signal 3 permits 28 data content bits to be clocked into the buffer, the remaining 12 bits of the received 40 bit data block being parity bits.

If the BCH-logic block 7 detects a fault to be corrected, it will change the status of the syndrome 13 outputs. The position of the fault is indicated as being the number of zeros clocked to the BCH-logic block during the first repetition minus one (Position=N(0)−1). The correction block 9 will then detect the changes in the syndrome 13 and provide a correction signal 14 for the faulty bit, the corrected bit being then supplied to the buffer 10. Because the clocking of the bit flow 15 and the zeros is simultaneous, it is possible to correct the faulty bit in synchronism, with the clocking when the bit flow 15 is directed to the buffer 10 in serial mode.

A receiver counter (FIG. 1, block 16) counts the bits in a received frame. At the end of a word (a block of 40 bits) the counter circuit raises a repeat flag RFLAG, as is shown in FIG. 4. RFLAG is raised at the end of the repeating words and causes an interrupt to the mobile phone microprocessor, which is recognized by the microprocessor if interrupts are allowed. The repeat counter in the processor counts the RFLAG interrupts 1 ... 11.

The receiver counter also produces a word flag (WFLAG), which indicates that the circuit of FIG. 1 has processed a sufficient number (such as five) of repeated words, and that the decoding result is available for the micro-processor.

The receiver counter or counter circuit, as well as other counters mentioned above, could also be realized in software running on the microprocessor controlling the mobile phone.

In a good radio reception field, the data block counting ensures better timing and better reception of the CLI messages, than just the timer-based approach. Also, the system can be configured so that it uses and counts RFLAGs to determine repeat and frame timing, and additionally to use a timer as a backup to detect if the overall frame time has been exceeded. Slips over the frame edges, i.e., losing information about the exact frame boundaries (when one frame ends and another frame begins) and thus mixing repeated blocks from one frame with blocks from a different frame, are avoided when 11 RFLAG interrupts are counted before the timer alarm. In this way, the system maintains frame integrity. The RFLAG interrupts also provide an exact timing for every repeating data block, enabling the processor to monitor the modem synchronism and keep the frame synchronization intact. Also, more reliable operation can be achieved by using and counting RFLAGs to determine repeat and frame timing, and additionally to use a timer as a backup to monitor if the overall frame time has been exceeded. If required, the processor is then also able to command the modem to resynchronize. This provides an advantage in poor reception conditions.

The circuit continuously receives a bit clock signal 2, which is synchronized to the receiver clock. This bit clock signal maintains synchronous operation between the system and the received data. The decoding logic is flip-flop based, which enables continuous clocking operation synchronized to the incoming bit stream. It is also an advantage of the present invention that is noted from the figure and from the above description, that no extra clock nor an increased clock frequency is required for the described operation. Another advantage of the present invention is that no separate resetting phase is required between reception of frames, thus requiring only an extremely simple logic arrangement.

The RFLAG and the WFLAG signals can be used for the control messages on the Forward Control Channel (FOCC) or Forward Voice Channel (FVC) data.

Turning now to FIG. 4, there is shown the timing of the essential CLI signals in the arrangement in FIG. 1. On the first line is shown a CLI signal represented by the FVC data stream. As shown in FIG. 2a, this bit stream is divided into a bit synchronization block (37 bits), a word synchronization block (11 bits), and repeating words 1 ... 11, containing 40 bits each, of which 28 bits are data and 12 bits are parity.

The circuit maintains synchronism by checking the 11 bit word synchronization block to determine if it matches an expected pattern. This is applicable to both the FOCC and FVC channels. If the received word synchronization bits match, a synchronism flag (SFLAG) is set high. If the received word synchronization bits do not match, SFLAG is cleared. Thus, when the processor receives an interrupt (for instance a WFLAG on FOCC or a RFLAG on FVC), the processor checks the status of SFLAG. If SFLAG is high, the processor allows the circuit to continue receiving data. If SFLAG is low, this is an indication that the timing portion of the circuit, e.g., a digital phase-locked loop, is not operating properly and that the bit counting process is leading (ahead) or lagging (behind) the actual frame position in the bit stream. The processor can then resynchronize the circuit so that bit counting is cleared and ready to start again from the next word synchronization pattern in the frame.

In an FVC data stream, each word is repeated 11 times. In a predetermined way, the word block is treated as either a first set of 5 repeated words and a second set of 6 words or a first set of 6 repeated words and a second set of 5 repeated words. The voting is performed on both sets, or only one preselected set, if desired. The words 1 ... 11 are received by the voting logic 8 (FIG. 1), but only 5 repeated words at a time comprise one set. During the fifth word of a set, the 3/5 voting result 6 is clocked to the BCH decoding logic 7. When five repeated words of the set have been received in the voting block, the second set of five repeated words from the same frame can be received. During the second set, the result of the first set is processed further by clocking the result through line 15 to the buffer, which is enabled by the signal 3 during the 28 data bits. The 28 data bits are corrected with the correction signal 14 and then clocked out to the data bus 12. The operation is synchronized with the received data bits on line 1. The second set is processed during the eleventh repeated word and is ready after the eleventh RFLAG. To receive the next message frame correctly, the repeat counter of receiver timing block 16 must be reset after the eleventh RFLAG.

In the case of an FVC frame, there are 11 repeated data blocks. Since only 5 repeated data block are needed for 3/5 voting and BCH-decoding, the circuit can process a first set of 5 frames and a second set of 5 frames. After both sets have been processed, the microprocessor can compare the decoding result (11) for both sets and select the better set. This is possible since the decoding result (11) indicates whether a set is error-free, corrected by BCH-decoding, or erroneous. Thus, for example if one set has been corrected by BCH-decoding and another set has been received error-free, the microprocessor would select the error-free set. In this way, the system can select the set with the higher quality or the least amount of errors.

The above described CLI message may contain for instance 9 or 33 repeated frames. However, the present invention may be used in other systems, which utilize a similar frame structure. For example, a dual-mode radio telephone receives a control message comprising two consecutive voice channel frames, when the phone is switched over from analog to digital operation. Here, the invention can be used to discriminate the control message frames.

The above description concerns only illustrative examples, and a person skilled in the art is able to modify the invention in many ways, based on the teaching of this description, the scope of the invention thus being limited only by the claims set forth below.

We claim:

1. An apparatus in a mobile phone comprising:

a counter circuit to count a plurality of received data blocks contained in a frame;

a 3/5-voting logic element operating on five of the plurality of received data blocks, wherein the 3/5 voting logic element receives the plurality of received data blocks as a data flow when the 3/5 voting logic element is selected with a bit enable signal, the 3/5 voting logic element performing a 3/5 voting process, producing a voting result and an output data stream at the end of the 3/5 voting process;

a BCH decoding circuit having an input and output, the input being connected to the voting result and the output being a received data frame syndrome;

a correction device having an input and a first and second output, the input being connected to the received data frame syndrome, the first output being a decoding result and the second output being a bit correction signal;

a data buffer having an output and a plurality of inputs, a first one of the plurality of inputs being connected to the output data stream of the 3/5 voting logic element and a second one of the plurality of inputs being connected to the bit correction signal, the data buffer producing at its output a data stream of corrected data; and a receiver timer connected to the BCH-decoding circuit, 3/5-voting logic element and data buffer, which produces timing information for the BCH-decoding circuit, the 3/5-voting logic element, and the data buffer.

2. The apparatus of claim 1, wherein during the reception of a first data block (A1') of the next frame, the data buffer receives from the 3/5-voting logic element the output data stream representing a data portion of previously received data blocks (A1–A5).

3. The apparatus of claim 2, wherein the voting logic element and the data buffer receive a clock signal which is generated from the data flow, whereby the apparatus operates synchronous with the received data flow.

4. The apparatus of claim 1, wherein during the reception of a sixth data block of the frame, the data buffer receives the output data stream from the 3/5 voting logic element, representing a data portion of previously received data blocks (A1–A5).

5. The apparatus of claim 4, wherein during the reception of an eleventh data block of the frame, the data buffer receives the output data stream from the 3/5 voting logic element, representing a data portion of previously received data blocks (A6–A10).

6. The apparatus of claim 5, wherein the voting logic element and the data buffer receive a clock signal which is generated from the data flow, whereby the apparatus operates synchronous with the received data flow.

7. The apparatus of claim 1, wherein the voting logic element and the data buffer receive a clock signal which is generated from the data flow, whereby the apparatus operates synchronous with the received data flow.

8. An apparatus in a mobile phone comprising:
a counter circuit to count a plurality of received data blocks contained in a frame, wherein a selected number of the plurality of data blocks forms a set, the selected number preferably being five data blocks;
a 3/5-voting logic element operating on five of the plurality of received data blocks, wherein the 3/5 voting logic element receives the plurality of received data blocks as a data flow when the 3/5 voting logic element is selected with a bit enable signal, the 3/5 voting logic element performing a 3/5 voting process, producing a voting result and an output data stream at the end of the 3/5 voting process;
a BCH decoding circuit having an input and output, the input being connected to the voting result and the output being a received data frame syndrome;
a correction device having an input and a first and second output, the input being connected to the received data frame syndrome, the first output being a decoding result and the second output being a bit correction signal;
a data buffer having an output and a plurality of inputs, a first one of the plurality of inputs being connected to the output data stream of the 3/5 voting logic element and a second one of the plurality of inputs being connected to the bit correction signal, the data buffer producing at its output a data stream of corrected data; and
a receiver timer connected to the BCH-decoding circuit, 3/5-voting logic element and data buffer, which produces timing information for the BCH-decoding circuit, the 3/5-voting logic element and the data buffer.

9. The apparatus of claim 8, wherein during the reception of a first data block (A1') of the next frame, the data buffer receives from the 3/5-voting logic element the output data stream representing a data portion of previously received data blocks (A1–A5).

10. The apparatus of claim 9, wherein the voting logic element and the data buffer receive a clock signal which is generated from the data flow, whereby the apparatus operates synchronous with the received data flow.

11. The apparatus of claim 8, wherein during the reception of a sixth data block of the frame, the data buffer receives the output data stream from the 3/5 voting logic element representing a data portion of previously received data blocks (A1–A5).

12. The apparatus of claim 11, wherein during the reception of an eleventh data block of the frame, the data buffer receives the output data stream from the 3/5 voting logic element representing a data portion of previously received data blocks (A6–A10).

13. The apparatus of claim 12, wherein the voting logic element and the data buffer receive a clock signal which is generated from the data flow, whereby the apparatus operates synchronous with the received data flow.

14. The apparatus according to claims 12 or 14, wherein the counter circuit raises a repeat flag at the end of each data block, and wherein loss of frame boundaries are avoided by counting each repeat flag at the end of each data block, whereby exact timing is maintained for the received data blocks and the first and second frame integrity is kept intact.

15. The apparatus according to claim 14 wherein the received data blocks are Forward Voice Channel (FVC) data.

16. The apparatus according to claim 15, wherein the received data blocks comprise a Calling Line Identification (CLI) message.

17. The apparatus of claim 14, wherein the received data blocks are decoded as a first and second set of five data blocks, the decoding result line (11) indicating a first and second quality of the first and second sets, whereby a mobile phone processor of the apparatus selects one of the first and second sets having a higher one of the first and second quality as the received data block.

18. The apparatus of claim 8, wherein the voting logic element and the data buffer receive a clock signal which is generated from the data flow, whereby the apparatus operates synchronous with the received data flow.

19. The apparatus according to claims 3, 10, 7, or 18 wherein the counter circuit raises a repeat flag at the end of each data block, and wherein loss of frame boundaries are avoided by counting each repeat flag at the end of each data block, whereby exact timing is maintained for the received data blocks and the first and second frame integrity is kept intact.

20. The apparatus according to claim 17 wherein the received data blocks are Forward Control Channel (FOCC) data.

* * * * *